United States Patent [19]

Petruchik

[11] Patent Number: 5,521,665
[45] Date of Patent: May 28, 1996

[54] COMPOSITE IMAGE CAMERA WITH FLASH DEVICE

[75] Inventor: Dwight J. Petruchik, Honeoye Falls, N.Y.

[73] Assignee: Eastman Kodak Company, Rochester, N.Y.

[21] Appl. No.: 367,988

[22] Filed: Jan. 3, 1995

[51] Int. Cl.⁶ .................................................. G03B 15/03
[52] U.S. Cl. .................. 354/149.1; 354/106; 354/149.11; 354/288
[58] Field of Search ........................... 354/149.1, 112, 354/288, 103, 110, 111, 149.11, 106

[56] References Cited

U.S. PATENT DOCUMENTS

| | | | |
|---|---|---|---|
| 4,717,930 | 1/1988 | Wheeler | 354/108 |
| 5,179,401 | 1/1993 | Reddig | 354/149.11 |
| 5,194,885 | 3/1993 | Spencer | 354/132 |

FOREIGN PATENT DOCUMENTS

| | | |
|---|---|---|
| 0499742A1 | 5/1991 | European Pat. Off. . |
| 3-47530 | 5/1991 | Japan . |

Primary Examiner—D. Rutledge
Attorney, Agent, or Firm—Roger A. Fields

[57] ABSTRACT

A composite image camera comprises a transparency with indicia or the like supported in registry with a defined section of a film frame to enable an image of the indicia to be exposed onto the defined film section, and a taking lens for exposing onto a remaining section of the film frame an image of a subject being photographed. According to the invention, a flash device is oriented with respect to the taking lens to center flash illumination reflected off the subject on the remaining section of the film frame rather than on the whole of the defined and remaining sections of the film frame.

5 Claims, 3 Drawing Sheets

5,521,665

COMPOSITE IMAGE CAMERA WITH FLASH DEVICE

FIELD OF THE INVENTION

The invention relates generally to the field of photography, and in particular to a composite image camera for exposing an image of indicia or the like onto a defined section of a film frame and for exposing an image of a subject being photographed onto a remaining section of the film frame.

BACKGROUND OF THE INVENTION

Prior art U.S. Pat. No. 4,717,930, issued Jan. 5, 1988, discloses a composite image camera in which a transparent plastic block overlies a front wall of the camera housing including a flash emission window of a built-in flash device. Most of the flash illumination is intended to pass through the block toward a subject being photographed. A small amount of the flash illumination is channeled within the block to a tubular or elliptical bore in the block which is aligned with a taking lens. The channeled light and reflected light from the subject pass through the bore, the taking lens, and a graphics-bearing transparency covering a film sheet, to expose superimposed images of the graphics and the subject onto the filmsheet. Several problems can occur in this instance. For example, since the respective images of the graphics and the subject exposed onto the film sheet are superimposed, it may be difficult to distinguish each of the images in a composite photograph due to poor relative contrast. Also, the intermixing of the channeled light and reflected light from the subject adjacent the taking lens may cause flare spots to be formed inside the lens.

By contrast, prior art European Patent Application 0,499,742 A1, published Aug. 26, 1992, discloses a composite image camera comprising means for supporting a transparency with indicia or the like in registry only with a defined section of a film frame to enable an image of the indicia to be exposed onto the defined section of the film frame, and a taking lens for exposing an image of a subject being photographed onto a remaining larger section of the film frame. Since the respective images of the indicia and the subject are exposed onto the film frame side-by-side, rather than superimposed as in U.S. Pat. No. 4,717,930, there is no problem distinguishing one image from the other on a photograph. However, the composite image camera is not intended to be used with a flash device as in the U.S. patent.

SUMMARY OF THE INVENTION

A composite image camera comprising means for supporting a transparency with indicia or the like in registry with a defined section of a film frame to enable an image of the indicia or the like to be exposed onto the defined section of the film frame, and a taking lens for exposing onto a remaining section of the film frame an image of a subject being photographed, is characterized in that:

a flash device is oriented with respect to the taking lens to center flash illumination reflected off the subject on the remaining section of the film frame rather than on the whole of the defined and remaining sections of the film frame. Orienting the flash device in this manner is particularly useful when the image of the subject is not centered about the optical or main axis of the taking lens as in FIG. 3 of prior art European Patent Application 0,499,742 A1, and it is desired to expose the image only onto the remaining section of the film frame.

DETAILED DESCRIPTION OF THE INVENTION

The invention is disclosed as being embodied in a photographic still-picture camera. Because the features of a still-picture camera are generally well known, the description which follows is directed in particular only to those elements forming part of or cooperating directly with the disclosed embodiment. It is to be understood, however, that other elements may take various forms known to a person of ordinary skill in the art.

Figure 1:
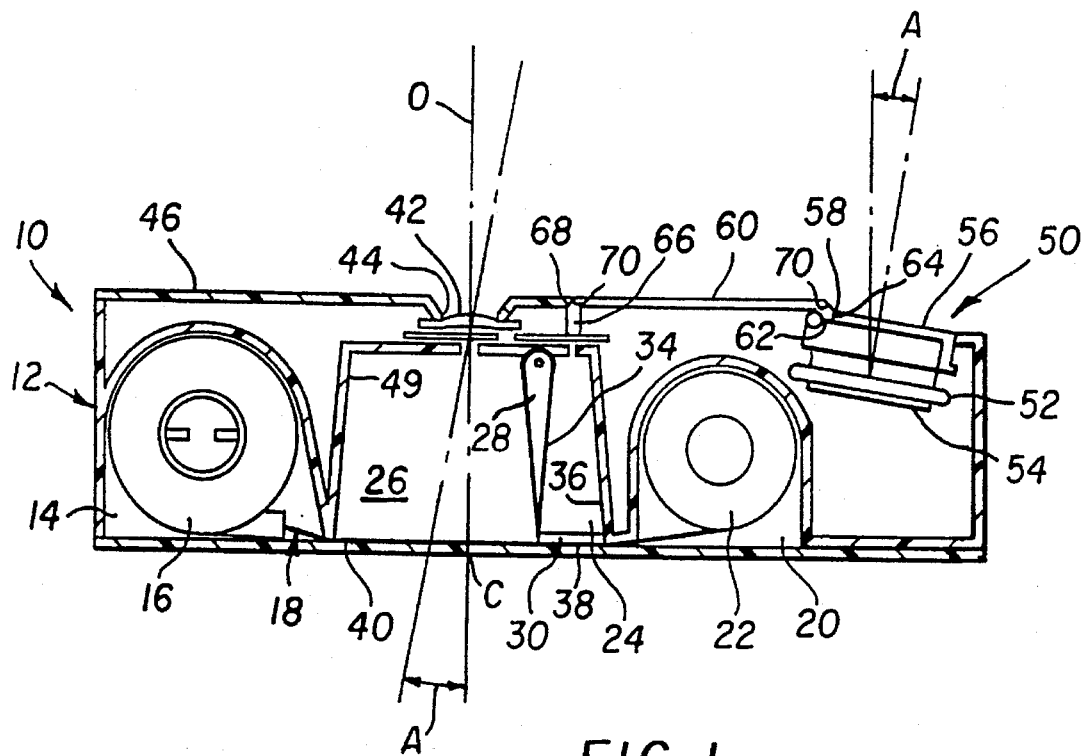
FIG. 1 is a sectional view of a composite image camera according to a preferred embodiment of the invention, showing the camera in a composite image mode.
Figure 2:
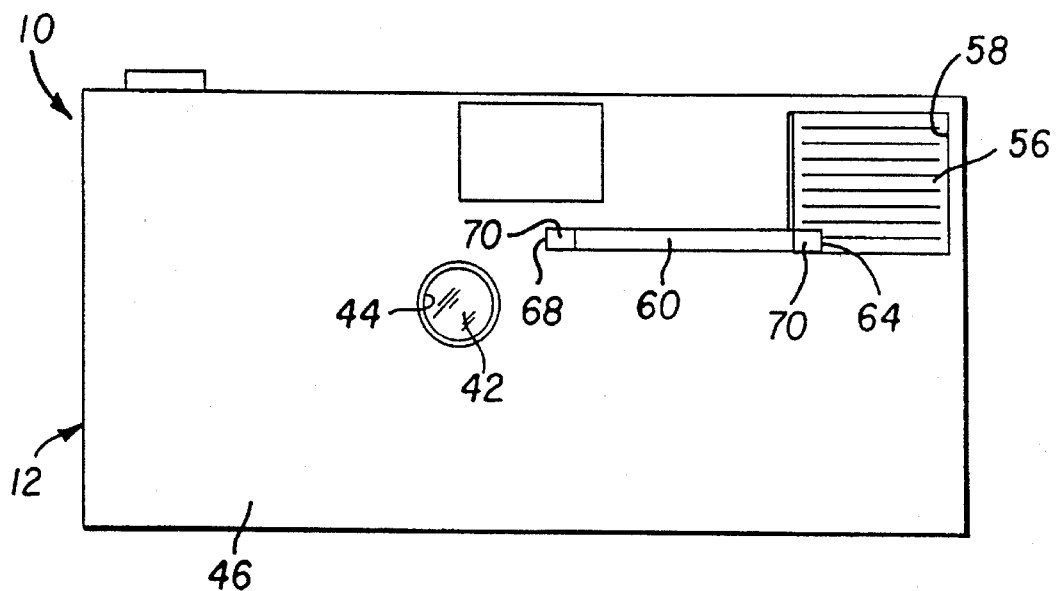
FIG. 2 is a front view of the composite image camera in its composite image mode.

FIGS. 1 and 2 show a composite image camera 10 having a camera housing 12. The camera housing 12 id divided into a supply chamber 14 for a conventional film cartridge 16 containing a 35 mm filmstrip 18, a take-up chamber 20 for a take-up roll 22 of the filmstrip, and two film exposure chambers 24 and 26 separated by a partition 28. The partition 28 is shown in FIG. 1 in a dividing position, but is pivotally mounted for movement to an alternative position shown in FIG. 3 (as disclosed in FIG. 9 of prior art European Patent Application 0,499,742 A1, published Aug. 26, 1992) to block off the exposure chamber 24 and to enlarge the exposure chamber 26. A removable transparency 30 with indicia 32 (see FIG. 5) or the like can be supported at opposed walls 34 and 36 in the exposure chamber 24 to be in registry only with a defined section 38 of a film frame 40 of the filmstrip 18, when the partition 28 is in its dividing position, to enable an image of the indicia to be exposed onto the defined section of the film frame. The transparency 30 is not intended to be present when the partition 28 is in its alternative position as shown in FIG. 3.

As shown in FIG. 1, a taking lens 42 is fixed beneath an opening 44 in a front wall 46 of the camera housing 12 for exposing onto a remaining larger section 48 of the film frame 40 in the exposure chamber 26 an image of a subject being photographed, when the partition 28 is in its dividing position. The taking lens 42 has its optical axis O centered on the film frame 40 at a centerpoint C, but cooperates with light-confining means 49 (including the partition 28 in its dividing position) to cause the exposure of the image being photographed to be centered off the optical axis O by a predetermined angle A. As is well known, the optical axis O is an imaginary line along which are the centers of curvature of each optical surface in the taking lens 42.

The camera housing 12 has a built-in flash device 50 comprising a flash tube 52, a flash reflector 54 containing the flash tube, and a flash emission window 56 secured over a front open end of the flash reflector at an opening 58 in the front wall 46 of the camera housing 12. An elongate slender, solid transparent plastic light pipe 60 is embedded in the front wall 46. The light pipe 60 has one right-angled end portion 62 that protrudes into an opening or recess 64 in the flash emission window 56 and another right-angled end portion 66 that protrudes through an opening 68 in the front wall 46, opposite the exposure chamber 24, in order to point directly toward the transparency 30 as shown in FIG. 1. Each of the right-angled end portions 62 and 64 include 45 degrees angled surfaces 70, shown in FIGS. 1 and 2. Consequently, the light pipe 60 will divert a small amount of the flash illumination through the transparency 30 to the defined section 38 of the film frame 40 when the partition 28 is in its dividing position.

Figure 3:
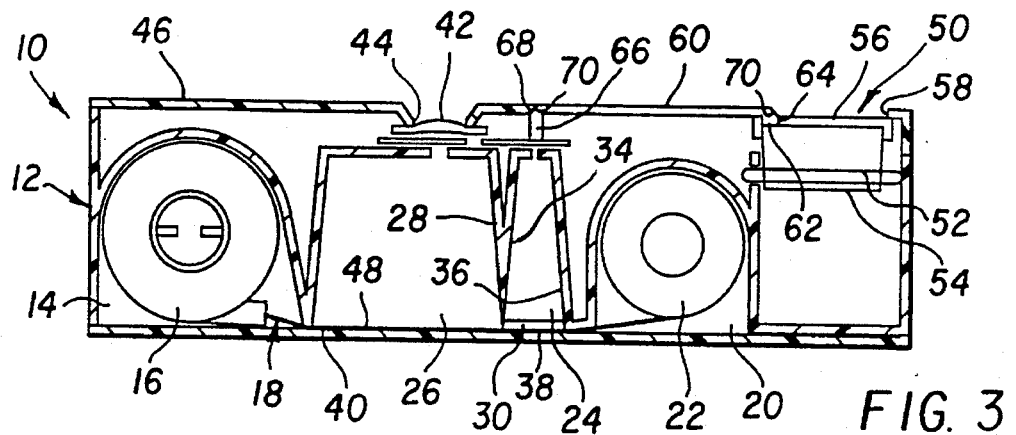
FIG. 3 is a sectional view of the composite image camera, showing the camera in a conventional mode.
Figure 4:
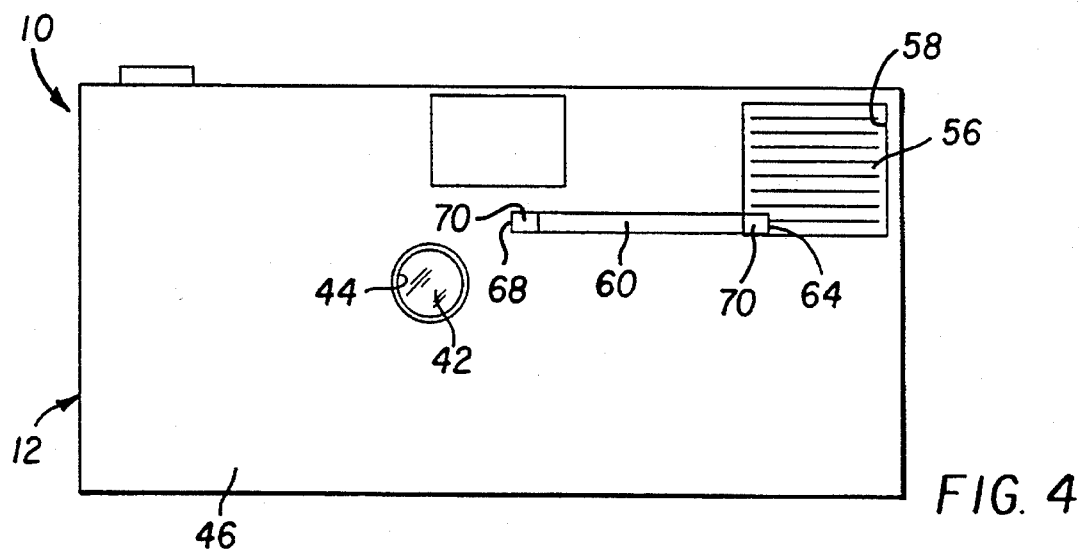
FIG. 4 is a front view of the composite image camera in its conventional mode;.

The flash device 50 is shown in FIGS. 1 and 2 in an angled position at the predetermined angle A to center flash illumination reflected off the subject being photographed on the remaining section 48 of the film frame 40 when the partition 28 is in its dividing position, but is pivotally mounted for movement to a direct position shown in FIGS. 3 and 4 to center flash illumination on the whole of the defined section 38 and the remaining section of the film frame when the partition is in its alternative position (i.e. the transparency 30 is not present).

Figure 5:
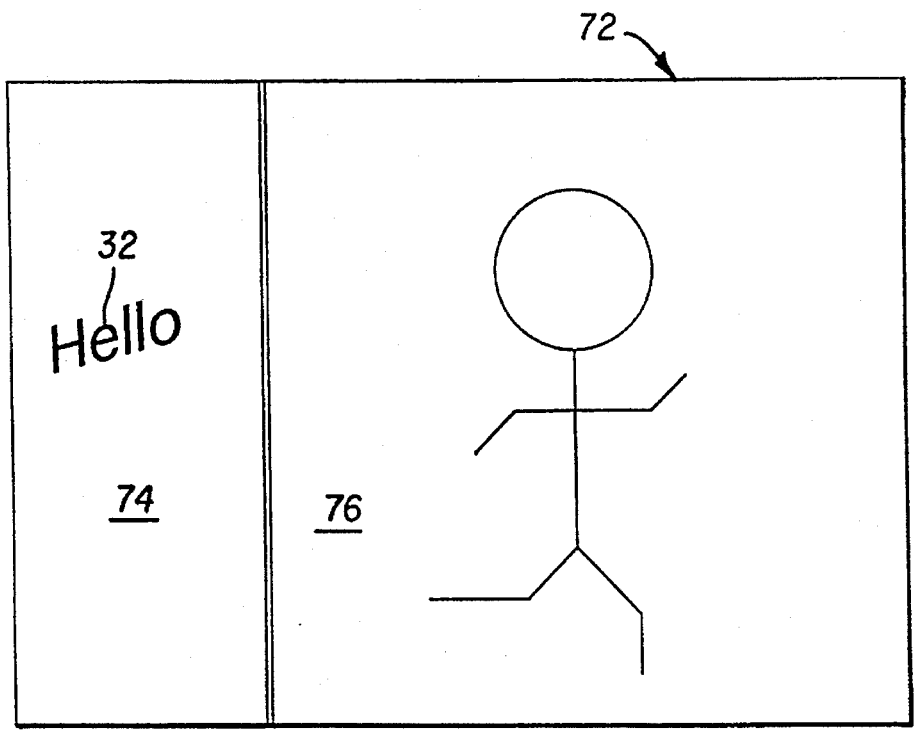
FIG. 5 is a front view of a photograph produced using the composite image camera in its composite image mode.

FIG. 5 shows a photograph 72 that is obtained using the image composition camera 10 when the partition 28 is in its dividing position. The photograph 72 has side-by-side images 74 and 76 of the indicia 32 and the subject that was photographed.

Figure 6:
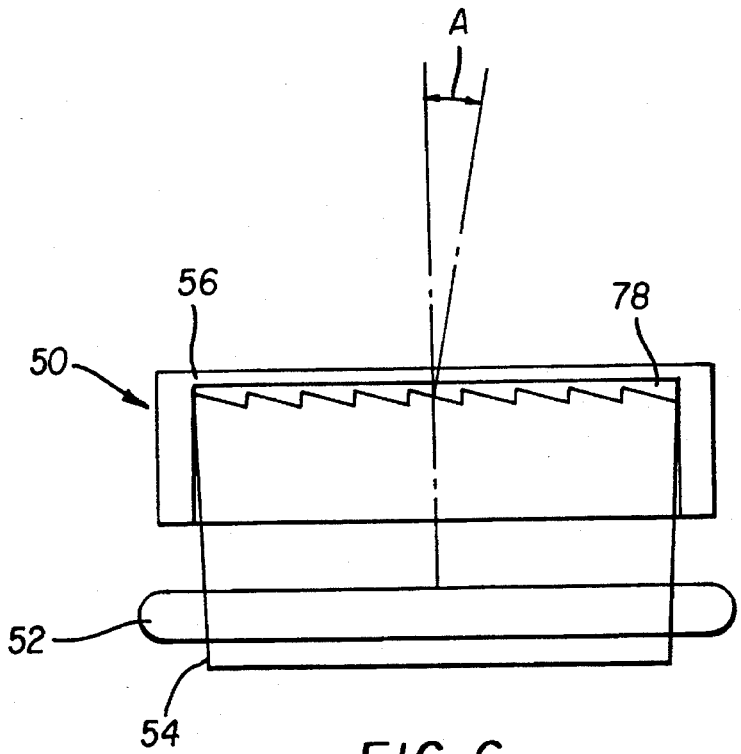
FIG. 6 is an alternative embodiment of the invention.

FIG. 6 shows an alternative embodiment of the flash device 50. In this instance, the flash device is fixed in its direct position rather than movable to the angled position, but the flash emission window 56 has a removable diffractive lens 78 to center flash illumination reflected off the subject being photographed on the remaining section 48 of the film frame 40 when the partition 28 is in its dividing position. The diffractive lens 78 is removed when the partition 48 is in its alternative position.

The invention has been described with reference to a preferred embodiment. However, it will be appreciated that variations and modifications can be effected by a person of ordinary skill in the art without departing from the scope of the invention.

PARTS LIST
10. composite image camera
12. camera housing
14. supply chamber
16. film cartridge
18. filmstrip
20. take-up chamber
22. take-up film roll
24. exposure chamber
26. exposure chamber
28. partition
30. transparency
32. indicia
34. chamber wall
36. chamber wall
38. defined film section
40. film frame
42. taking lens
44. opening
46. front wall
48. remaining film section
O. optical axis
C. centerpoint
49. light-confining means
A. predetermined angle
50. flash device
52. flash tube
54. flash reflector
56. flash emission window
58. opening
60. light pipe
62. pipe end portion
64. window opening
66. pipe end portion
68. wall opening
70. angled surfaces
72. photograph
74. image
76. image
78. diffractive lens

I claim:

1. A composite image camera comprising means for supporting a transparency with indicia or the like in registry with a defined section of a film frame to enable an image of the indicia or the like to be exposed onto the defined section of the film frame, and a taking lens for exposing onto a remaining section of the film frame an image of a subject being photographed, is characterized in that:
   a flash device is oriented with respect to said taking lens to center flash illumination reflected off the subject on the remaining section of the film frame rather than on the whole of the defined and remaining sections of the film frame.

2. A composite image camera as recited in claim 1, wherein said transparency is removable, a partition is movable between a dividing position establishing a light-blocking boundary between said defined and remaining sections of the film frame when said transparency is present and an alternative position removing the light-blocking boundary when the transparency is not present, and said flash device is movable between an angled position to center flash illumination reflected off the subject on the remaining section of the film frame when said partition is in its light-blocking position and a direct position to center flash illumination on the whole of the defined and remaining sections of the film frame when the partition is in its alternative position.

3. A composite image camera as recited in claim 1, wherein an elongate slender light pipe has one end portion at said flash device and another end portion pointing directly toward the transparency to divert a small amount of flash illumination emitted from the flash device to the defined section of the film frame.

4. A composite image camera as recited in claim 1, wherein said taking lens and said flash device point in the same direction, and said flash device has a diffractive lens for angling flash illumination emitted from the flash device to center flash illumination reflected off the subject on the remaining section of the film frame.

5. A composite image camera comprising means for supporting a transparency with indicia or the like to enable an exposure of an image of the indicia or the like to be made only on a defined section of a film frame, and a taking lens and associated light-confining means for making an exposure of an image of a subject being photographed only on a remaining section of the film frame to cause the exposure to be centered off an optical axis of said taking lens by a predetermined angle, is characterized in that:
   a flash device is oriented with respect to said taking lens to center flash illumination reflected from the subject onto the remaining section of the film frame off the optical axis of the taking lens by the predetermined angle.

* * * * *